Figure 1:
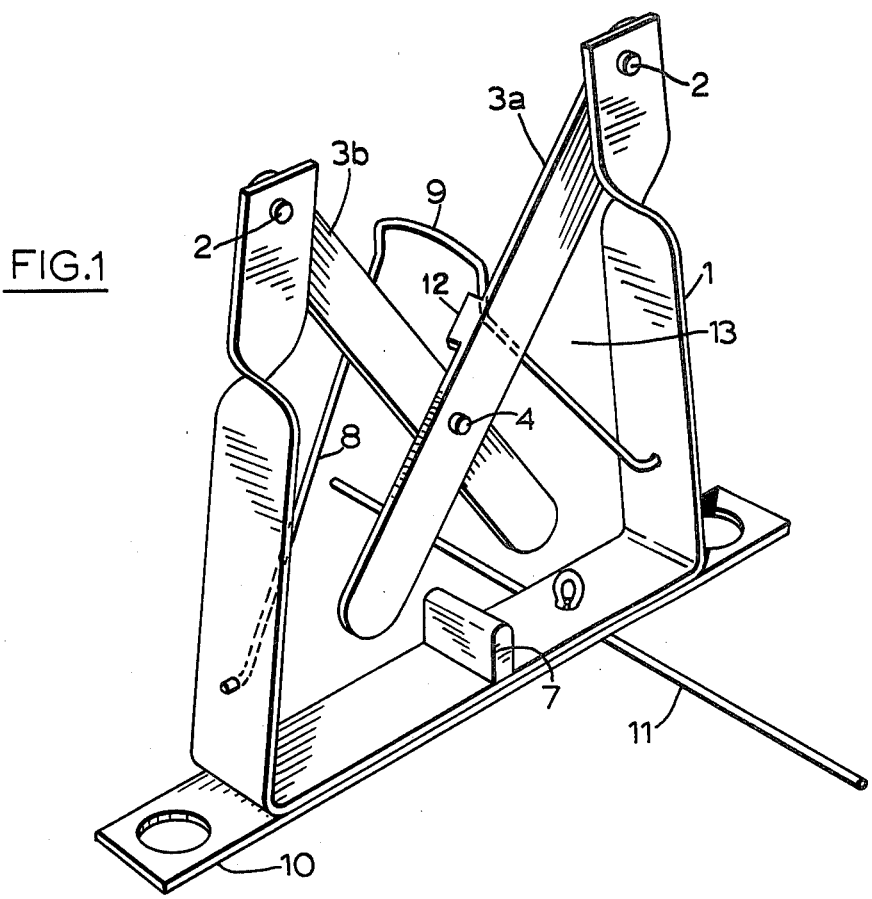

United States Patent [19]

Jacob

[11] 4,161,842
[45] Jul. 24, 1979

[54] TRAPS FOR ANIMALS

[76] Inventor: Armand Jacob, R.R. 5, Tilbury, Ontario, Canada

[21] Appl. No.: 792,533

[22] Filed: May 2, 1977

[51] Int. Cl.² .......................................... A01M 23/24
[52] U.S. Cl. .......................................... 43/85; 43/94; 43/77
[58] Field of Search .................. 43/77, 78, 81, 82, 85, 43/88, 94

[56] References Cited

U.S. PATENT DOCUMENTS

| | | | |
|---|---|---|---|
| 1,003,891 | 9/1911 | Falls | 43/78 |
| 1,445,892 | 2/1923 | Kovatch | 43/85 |
| 1,580,583 | 4/1926 | Catlin | 43/94 |
| 2,042,728 | 6/1936 | Neville | 43/85 X |
| 4,030,231 | 6/1977 | Fukutome | 43/85 |

FOREIGN PATENT DOCUMENTS

| | | | |
|---|---|---|---|
| 692373 | 11/1930 | France | 43/77 |
| 201540 | 2/1966 | Sweden | 43/94 |
| 3894 | of 1904 | United Kingdom | 43/94 |

*Primary Examiner*—Edward M. Coven
*Attorney, Agent, or Firm*—Ridout & Maybee

[57] ABSTRACT

The invention seeks to provide a humane trap which dispatches trapped animals without pain or panic. A peripheral trap frame, open on one side, has sides on either side of the open side spring urged towards one another to provide the motive power for a pair of strike arms connected in scissors fashion and forming a toggle linkage tending to collapse inwardly of the frame under the spring pressure so as to deliver a killing blow to an animal whose head is passed through the frame opening. The toggle linkage is prevented from collapsing when the trap is set by a wire loop which is knocked clear of the linkage by an animal reaching a predetermined position within the trap.

5 Claims, 4 Drawing Figures

TRAPS FOR ANIMALS

This invention relates to humane traps for animals.

For the purposes of this specification a humane trap may be defined as a trap which dispatches a trapped animal without pain or panic. In practice this means that the trap when sprung by an animal entering it should reliably and substantially instantaneously kill the animal, or at the least render it immediately unconscious with death rapidly supervening. In a practical trap, there are the further requirements that it be effective as a trap and that, where fur bearing animals are trapped, the fur or pelt is not damaged.

Various types of humane trap have been developed, none of which has been wholly satisfactory. In particular, it has been difficult to ensure that the trap when sprung can be relied upon to strike the animal at such a location and with such force as to meet the definition of a humane trap set out above.

The object of the invention is to provide a trap which is of robust and compact construction, and is capable of meeting the requirements of a humane trap.

My invention provides a trap for animals which comprises a peripheral frame defining an opening, and having a gap therein, portions of the frame to either side of the gap being spring urged towards one another. A pair of strike arms, used to deliver a killing blow to an animal entering the trap, is pivotally connected to the frame, one arm to each side of the gap, and the arms are pivotally connected to one another to form a toggle linkage which the spring loading of the frame urges into a more or less collapsed condition within the frame opening when the trap is in a sprung condition. A latch is provided to hold the assembly of frame and strike arms in an alternative set condition with the toggle linkage at least partially straightened and the frame portions to either side of the gap drawn apart. A trigger device operated by an animal reaching a predetermined position with its neck in the opening is provided to release the latch, whereupon the spring urging of the frame portions causes the toggle linkage to collapse and the strike arms are forced into the frame opening to deliver a killing blow to the neck of the animal.

Preferably, the strike arms overlap in scissors fashion so as to exert a continued clamping action on the animal's neck after the initial blow. This effect may be augmented by providing an anvil on that side of the frame opposite the gap which cooperates with the strike arms, and ensures that in the event of the initial blow to the neck not proving immediately fatal, the clamping force will rapidly terminate life without the animal regaining consciousness.

The latching means may be provided by a wire loop pivotally connected to the frame for movement between a position in which it blocks movement of the strike arms out of their set position, and an alternative position in which it does not block such movement, the wire loop being configured with a trigger portion, lying in the path of an animal passing through the opening in the frame so that such passage results in movement of the loop into its alternative position. The configuration of the loop is readily adjusted so that triggering occurs when an animal to be trapped has reached a position in which a vital part lies in the plane of the strike arms.

The principles of the invention may also be employed with advantage in traps incorporating additional features not forming part of the present invention and still further improving its performance as a humane trap.

Figure 2:
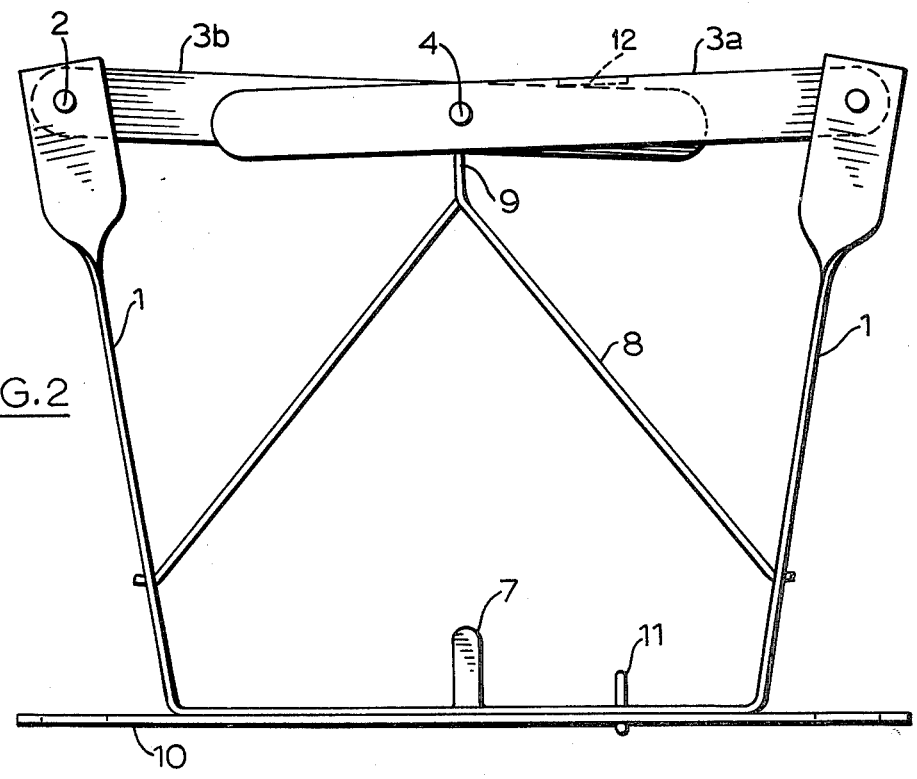
Figure 3:
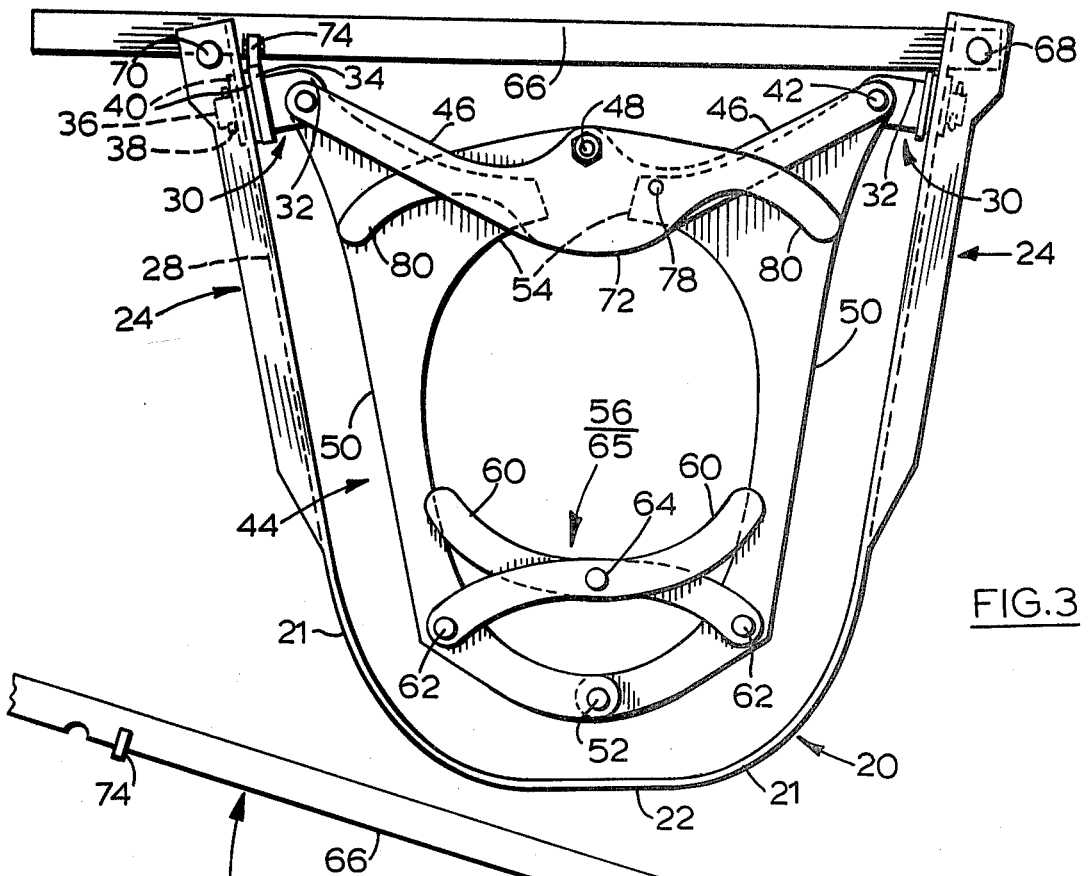
Figure 4:
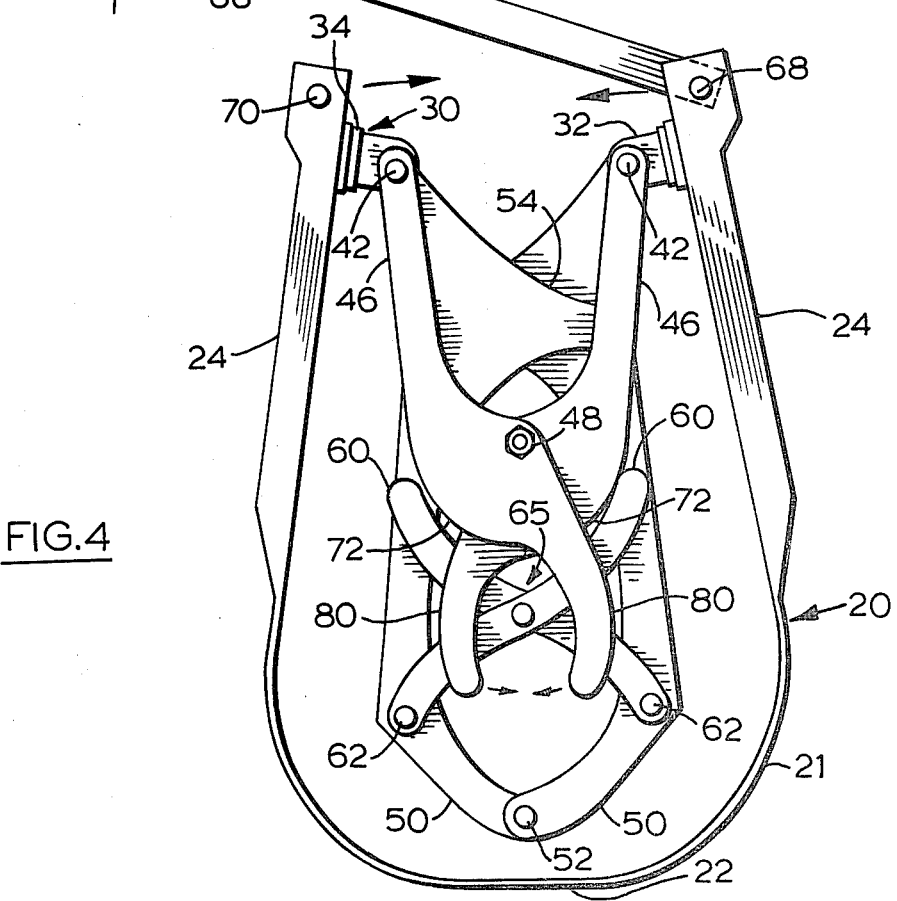

Illustrative embodiments of the invention are described with reference to the accompanying drawings, in which:

FIG. 1 is a perspective view of one form of trap in accordance with the invention, in a sprung condition, FIG. 2 is a front elevation of the same trap, in a set condition, FIG. 3 is a front elevation of a further embodiment of the trap, in a set condition, and FIG. 4 is a front elevation of a portion of the trap of FIG. 3, in a sprung condition.

Referring first to FIGS. 1 and 2, a trap comprises a peripheral frame member fabricated from spring steel strip and bounding three sides of a quadrilateral opening 13. In order to allow the trap to be located in an appropriate position, a plate 10 is secured to that side of the frame member opposite its open side, which plate may be staked, pegged, nailed, tied or otherwise secured in a desired location. Additionally or alternatively, one or more wire stays 11 may be provided.

The free ends of the frame member 1 are twisted through 90° so as to lie in a common plane, and are secured by pivots 2 to strike arms 3a and 3b, which in turn are connected together by a pivot 4 so as to form a toggle linkage lying in the plane of the opening 13. As shown in FIG. 1, this takes up a more or less collapsed condition when the trap is in its sprung condition, but when the trap is in the set condition shown in FIG. 2, the linkage is almost straightened. In order to bring the arms to their set position, it is necessary to spread further apart the free ends of the frame 1, involving the storage of potential energy in the spring steel of the frame, and the trap is both latched in the set condition and triggered by means of a wire loop 8, the ends of which are pivoted in the sides of the frame, and a central portion of which extends perpendicular to the plane of the frame to form a saddle which latches the toggle linkage against collapse when the trap is in its set condition. A stop 12 on the arm 3b prevents over centre movement of the linkage by engaging the arm 3a. The intermediate portions of the loop are configured so that movement of an animal through the frame opening results in its engaging the loop and dislodging the saddle from beneath the toggle linkage. Once the saddle is dislodged, the strike arms 3a and 3b are unlatched, and are accelerated into the frame opening as the toggle linkage collapses and the potential energy stored in the frame is converted into kinetic energy. The accelerated strike arms deliver a killing blow to the animal in the frame opening; the loop is configured so that it will not be dislodged until the animal has passed its head sufficiently through the frame opening for the back of its neck to be situated beneath the strike arms 3a, 3b, thus maximising the effect of the blow delivered.

The trap described has the advantages of providing a compact and simple structure which is capable of delivering a very effective killing blow to a vital part of an animal being trapped. The toggle action of the strike arms provides a strike action of excellent characteristics, the arms being accelerated to deliver a sharp chop to the back of the neck at the base of the skull, a well known vital point, followed by a squeezing action on the neck accomplished by interaction of the overlapping portions of the strike arms in cooperation with an optional anvil member 7 projecting from the bottom side of the frame member 2.

The embodiment of the invention shown in FIGS. 3 and 4 incorporates further developments which were not invented by me, but which in conjuncton with my invention provide a still further enhanced performance.

The trap comprises a spring frame 20 fabricated from spring steel and comprising a base spring portion 22 and two free end arms 24 joined to the base portion by curved spring portions 21. The spring frame normally assumes the configuration shown in FIG. 4, with the tops of the end arms 24 close together, but the end arms can be pulled apart so that the frame 20 assumes the configuration shown in FIG. 1. The end arms themselves are formed with out-turned side flanges 26 flanking a central web 28 having a central aperture (not shown). The purpose of this configuration is to provide arms 24 which are strong and rigid, but at the same time have a shape which can move through water with a minimum of resistance. This property is significant if the trap is to be used below water, since under these circumstances much of the energy stored in the spring frame can be dissipated in the water if the frame is inappropriately shaped.

It should be borne in mind that a primary function of the frame is to support the trap in a desired position, and for this reason the base spring 22 should be provided with means permitting the trap to be mounted. These mounting means may take any convenient form, for example cross bars secured to the base spring, or nails or pegs passing through apertures in the base spring. Such mounting means form no part of the invention, and indeed will often be provided by the user of the trap as and when required to position the trap.

The upper ends of the end arms 24 each support a hinge bracket 30 comprising a clevis 32, a trigger plate 34 and a pivot pin 36. The pivot pin 36 passes through the portion 28 of the end arm 26 and is secured in position by a split pin 38 passing through the pivot. In order to assure free movement of the hinge bracket, nylon washers 40 are placed between the split pin and the end arm, and the end arm and the trigger plate.

Suspended from the clevises 32 by means of hinges in the form of clevis pins 42 is a trap mechanism indicated generally by the reference numeral 44.

The trap mechanism comprises two strike bars 46, one connected at each hinge bracket 30 by the associated pin 42, the strike bars being interconnected at points intermediate their ends by a further pivot pin 48 forming a fulcrum for the action of each strike bar and the knuckle joint of a toggle linkage formed by the two bars 46. Also suspended from each clevis pin 42 is a curved link 50, the links 50 being connected by a pivot 52 at their lower ends to form a stirrup when the trap is in the condition shown in FIG. 3. The links 50 are further provided with shoulders 54 extending towards one another so that with the trap in its set condition, the links 50 together form a template defining a collar surrounding a jaw 56 forming a desirable opening. In order to match the size of this opening to a species of animal to be trapped, and in order to improve the action of the trap in a manner described in more detail hereinafter, two further links 60 are pivotally connected to the members 50 by pivots 62 and to each other by a pivot 64 to provide a further toggle linkage which forms a cradle indicated generally by the reference numeral 65. The jaw 56 as restricted by the links 60, is arranged so that its dimensions when the trap is set, are such as readily to pass the head of a species of animal to be trapped, but not to pass the shoulders of that same species of animal.

This jaw 56, which is the only opening of substantial size in the trap, presents a desirable opening to an animal seeking to reach bait placed on the opposite side of the trap to the line of an animal's approach.

The toggle linkage formed by the strike bars 46 is in a substantially straightened condition when the trap is in the set condition shown in FIG. 3, with only a small angle between lines extending from pivots 42 through the pivot 48. The trap is latched in the set condition by means of a trigger bar 66 which is a part of a trigger mechanism which will be described in more detail below. The trigger bar is attached to one end arm 24 by means of a pivot 68 and engages a trigger pin 70 on the other end arm 24. When the trigger bar 66 is unlatched from the trigger pin 70, the end arms 24 are urged toward each other through the action of the base spring 22. This results in collapse of the toggle linkage formed by the strike bars 46, resulting in strike edges 72 on the strike bars being forced downwardly across the opening of the jaw 56 to deliver a heavy blow to any animal whose neck extends through the opening. The strike edges 72 are curved so as to continue to act directly downwards across the opening as the strike bars 46 turn about the pivots 42. Eventually, the strike bars reach the position shown in FIG. 4, in which the free ends of the strike bars, which are curved, embrace and exert a clamping action upon the neck of the animal. Movement of the end arms 24 towards one another also results in the members 50 being moved towards one another, resulting in turn in the collapse of the toggle linkage formed by the links 60 and defining the cradle 65, the free ends of the arms 60 enhancing the clamping action on the neck of the animal, and the portions of the links 60 adjacent to pivots 64 moving upwardly towards the strike edges 72 so as still further to increase the effect of the latter.

The trigger mechanism for dislodging the trigger bar 66 from the latch pin 70 comprises a trigger follower 74 secured to the latch bar 66 and resting on the top surface of the trigger plate 34 on the hinge bracket 32, the trigger plate being in the form of a cam configured so that turning movement of the hinge bracket 30 out of the plane of the spring frame 20 results in a lifting movement being imparted to the follower 74 sufficient to raise the trigger bar 66 clear of the trigger pin 70. The form of the cam provided by the trigger plate 74 can be very simple, and a square plate with its upper corners chamfered is entirely satisfactory.

In use, the trap may be brought to the set condition shown in FIG. 3 by using any suitable device to spread apart the end arms 24 sufficiently to enable a notch 76 on the under edge of the trigger bar 66 to engage the trigger pin 70. Normally the strength of the spring frame 20 will preclude this spreading apart of the end arms being achieved manually, and a suitable tool will need to be provided such as some form of screw or hydraulic jack. In order to secure the trap in the set position, a safety pin 78 may be provided which is passed through apertures in the strike bars 46 so as to secure them in the relative position shown in FIG. 4. At this stage, the base spring 22 may be mounted by suitable mounting means so as to secure the trap in a desired position with the trap mechanism 44 suspended and hanging vertically from the hinge brackets 30 and the trigger bar 66 in engagement with the trigger pin 70. At this stage, the pin 78 may be removed.

The actual location of the trap will depend on the trapper's know-how, but it should be noted that the trap of the present invention gives additional flexibility in positioning in that, when passing from the set to the sprung position, no part of the trap mechanism moves outside the space enclosed within the spring frame 20, which itself contracts in size as the trap is sprung. This is a considerable advantage, since it much reduces the likelihood of nearby vegetation or objects obstructing the operation of the trap, and the overall compact size of the trap allows it to be used in locations in which many known traps could not be used, both because of their overall size and because of the unobstructed space required around them to enable their free movement from a set to a sprung condition.

The trap is baited by placing a suitable bait at some point beyond the jaw 56 on the opposite side of the trap to the expected line of approach of an animal to be trapped. Such an animal, in seeking to reach the bait, will be attracted by the desirable opening provided by the jaw 56 and will pass its head through the opening in an attempt to reach the bait. As previously described, the jaw is sized so that the shoulders of the animal cannot pass through the collar formed by the links 50 and associated parts, and therefore the animal in attempting to reach the bait will press with its shoulders against the collar and in doing so will swing the entire trap mechanism 44 about the pivots 38 on the hinge brackets 30.

What I claim is:

1. A trap for animals comprising a peripheral frame defining an opening, and having a gap therein above the opening, portions of the frame to either side of the gap being spring urged towards one another, a pair of strike arms for delivering a killing blow to an animal entering the trap, said arms being pivotally connected to the frame one arm to each side of the gap, the arms being pivotally connected to one another to form a toggle linkage collapsible downwardly into a sprung condition within the frame opening under the spring urging of the frame, the assembly of frame and strike arms having an alternative set condition with the toggle linkage at least partially straightened and the frame portions to either side of the gap drawn apart, latch means to hold the assembly of frame and strike arms in said set condition, and trigger means to release the latch means upon an animal reaching a predetermined position with its neck in the opening beneath the strike arms.

2. A trap according to claim 1 wherein the strike arms are pivotally connected intermediate their length so that they cross one another in a scissors formation.

3. A trap according to claim 2 wherein an anvil is provided projecting from the frame beneath the gap and towards the strike arms.

4. A trap according to claim 1 wherein the latch means comprises a wire loop pivotally connected to the frame for movement about an axis transverse of the plane of the frame between a position in which the wire loop blocks movement of the strike arms out of their set position and an alternative position in which the wire loop does not block such movement.

5. A trap according to claim 4 wherein the trigger means is formed by part of the wire loop configured to lie in the path of an animal passing through the opening in the frame.

* * * * *